US008853645B2

(12) United States Patent
Okada et al.

(10) Patent No.: US 8,853,645 B2
(45) Date of Patent: Oct. 7, 2014

(54) RADIOGRAPHIC IMAGE DETECTOR, RADIOGRAPHIC IMAGING APPARATUS, RADIOGRAPHIC IMAGING SYSTEM

(71) Applicant: Fujifilm Corporation, Tokyo (JP)

(72) Inventors: Yoshihiro Okada, Ashigarakami-gun (JP); Tomoki Inoue, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 22 days.

(21) Appl. No.: 13/687,703

(22) Filed: Nov. 28, 2012

(65) Prior Publication Data

US 2013/0161525 A1   Jun. 27, 2013

(30) Foreign Application Priority Data

Dec. 22, 2011   (JP) .................................. 2011-282354

(51) Int. Cl.
*G01T 1/16* (2006.01)
*G01T 1/24* (2006.01)

(52) U.S. Cl.
CPC .. *G01T 1/16* (2013.01); *G01T 1/247* (2013.01)
USPC .......................................................... 250/394

(58) Field of Classification Search
CPC ........................................................ G01T 1/16
USPC ............................................ 250/394, 370.09
See application file for complete search history.

(56) References Cited

U.S. PATENT DOCUMENTS

| 7,786,444 B2* | 8/2010 | Wagenaar et al. ....... 250/363.04 |
| 2004/0200966 A1* | 10/2004 | Ramsden ...................... 250/367 |
| 2009/0219423 A1* | 9/2009 | Suzuki .......................... 348/302 |

FOREIGN PATENT DOCUMENTS

| JP | H09-021879 A | 1/1997 |
| JP | 2000-105278 A | 4/2000 |
| JP | 2003-255049 A | 9/2003 |
| JP | 2004-046143 A | 2/2004 |
| JP | 2005-176297 A | 6/2005 |

OTHER PUBLICATIONS

Extended European Search Report issued in corresponding EP 12194611.5 on Mar. 27, 2014.

* cited by examiner

*Primary Examiner* — David Porta
*Assistant Examiner* — Faye Boosalis
(74) *Attorney, Agent, or Firm* — Birch, Stewart, Kolasch & Birch, LLP

(57) ABSTRACT

The present invention provides a radiographic image detector that may maintain even resolution in 6 directions before and after 3-pixel binning process. Namely, out of plural pixels with hexagonal shaped pixel regions in a radiation detector, for plural pixel groups respectively configured from 3 pixels, 3 pixels worth of charges in the radiation detector are read together, the charge signals of these 3 pixels combined, and integrated in sequence with a charge amplifier. For specific pixel groups, out of 3 pixels configuring the specific pixel groups, the charge signals of 2 pixels worth, and the charge signal of the remaining 1 pixel worth are summed with the same charge amplifier using shifted integration timings. 3-pixel binning is thereby performed.

17 Claims, 6 Drawing Sheets

RADIOGRAPHIC IMAGE DETECTOR, RADIOGRAPHIC IMAGING APPARATUS, RADIOGRAPHIC IMAGING SYSTEM

CROSS-REFERENCE TO RELATED APPLICATION

This application claims priority under 35 USC 119 from Japanese Patent Application No. 2011-282354, filed on Dec. 22, 2011 the disclosure of which is incorporated by reference herein.

BACKGROUND OF THE INVENTION

1. Field of the Invention

The present invention relates to a radiographic image detector, a radiographic imaging apparatus and a radiographic imaging system. The present invention particularly relates to a radiographic image detector, radiographic imaging apparatus and a radiographic imaging system for direct conversion of radiation into charges.

2. Description of the Related Art

Many radiographic image detection apparatuses recently being put into practice employ radiation detectors such as Flat Panel Detectors (FPDs) that have a X-ray-sensitive layer disposed above a Thin Film Transistor (TFT) active matrix substrate, and are capable of directly converting X-ray data into digital data. Such FPDs have the advantage of enabling more immediate image and video image confirmation than for example conventional film screens, and their use is rapidly widening. Various types of these radiation detectors are proposed. For example, direct-conversion-type in which radiation is directly converted into charges in a semiconductor layer and the charges accumulated, and indirect-conversion-type in which radiation is first converted into light by a scintillator, such as CsI: Tl or GOS ($Gd_2O_2S$:Tb), and then the converted light is converted into charges in a semiconductor layer and the charges accumulated, are proposed.

In radiation detectors, for example, plural scan lines and plural signal lines are disposed intersecting with each other, and pixels are disposed in a matrix pattern corresponding to each of the intersections between the scan lines and the signal lines. The plural scan lines and the plural signal lines are connected to an external circuit peripheral to the radiation detector, for example an amplifier Integrated Circuit (IC) or a gate IC.

Reducing the size of the pixels in radiation detectors is an effective way to increase the resolution of FPDs. Particularly, in direct-conversion-type radiation detectors employing, for example, Se, various radiation detectors are proposed for high definition enhanced image quality that contribute to increasing the resolution whilst leaving the pixel size virtually unchanged. For example, products with small pixel size are proposed for FPDs for mammography where there is an emphasis on resolution.

The use of hexagonal shaped pixels in radiation detection apparatuses in order to achieve an increase in both resolution and sensitivity, is proposed (see for example Japanese Patent Application Laid-Open (JP-A) No. 2003-255049), since simply reducing the pixel size may lead to a drop in sensitivity due to the proportional relationship to surface area in a radiation detection element. With square shaped pixels, the resolution in diagonal directions is lower than in the horizontal and vertical directions. However, employing hexagonal shaped pixels may secure high resolution in each of the horizontal, vertical and diagonal directions.

When still imaging and video imaging (fluoroscopic imaging) by using the hexagonal shaped pixels described above, methods of reading charges from plural pixels at the same time and summing the obtained values (binning) shall be considered, in particular in order to maintain a high frame rate such as in video. Performing such pixel summing within a sensor must also be considered.

However, in pixel summing of plural hexagonal shaped pixels, unevenness in pixel positions (the positions of the center of gravity when plural pixels are treated as one pixel cluster) may occur before and after summing, depending on the summing method. Accordingly, even resolution in each of the horizontal, vertical and diagonal directions that has been secured in before summing secure may not be maintained in after summing.

SUMMARY OF THE INVENTION

The present invention provides a radiographic image detector that may maintain even resolution before and after combining the charges of the plural pixels in each of horizontal, vertical and diagonal directions.

A first aspect of the present invention is a radiographic image detector including: a sensor portion including a plurality of pixels, arrayed in a honeycomb pattern, that each generates charges according to irradiated radiation and has a hexagonal shaped pixel region; a detection section, provided for each of the plurality of pixels, each including a pixel electrode that collects the charges, a storage capacitor that accumulates the charges collected by the pixel electrode, and a first switching element and a second switching element that read out the charges accumulated in the storage capacitor; a plurality of first scan lines that are disposed one for each of a plurality of pixel rows and that are each connected to control terminals of the first switching elements in the corresponding pixel row; a plurality of second scan lines that are disposed one for each of respective pairs of the plurality of pixel rows that are adjacent to each other in a column direction, and that are each connected to control terminals of the second switching elements in the corresponding column direction adjacent pair of pixel rows; a plurality of data lines that are disposed so as to respectively intersect with the plurality of first scan lines and the plurality of second scan lines, the plurality of data lines including, a plurality of first data lines that transmit first charge signals corresponding to a combined charge amount of 3 pixels that are read out by the second switching elements of the 3 pixels mutually adjacent in the respective pairs of column direction mutually adjacent pixel rows, and a plurality of second data lines that transmit second charge signals corresponding to a combined charge amount of 2 pixels that are read out by the second switching element of the 2 specific pixels adjacent to the 3 pixels in the pixel row direction, and transmit third charge signals of 1 pixel that is read out by the first switching element of the 1 specific pixel adjacent to the 2 specific pixels in the pixel column direction; and a plurality of charge amplifiers that are each connected to one end of the plurality of respective data lines, the plurality of charge amplifiers including, a plurality of first charge amplifiers that convert the first charge signals into voltage signals during a first period and a plurality of second charge amplifiers that sum the second charge signals and the third charge signals together and convert the sum into voltage signals during a second period.

In a second aspect of the present invention, in the first aspect, the plurality of data lines may also transmit fourth charge signals that correspond to the charges of each of the plurality of pixels read out by the first switching elements provided in each of the plurality of pixels; and the plurality of charge amplifiers may also convert the fourth charge signals into voltage signals.

In a third aspect of the present invention, in the above aspects, the 3 pixels and 3 pixels configured by the 2 specific pixels and the 1 specific pixel, may configure pixel groups of repeating units of 3 successive pixels in the same pixel row direction, 2 successive pixels along a pixel row direction adjacent in the pixel column direction below the 3 successive pixels, and 1 pixel adjacent in the pixel column direction above the 3 successive pixels, and the pixels are disposed such that two adjoining sides of each of the respective 3 pixels are respectively adjacent to one side of each of the other 2 pixels from the respective 3 pixels.

In a fourth aspect of the present invention, in the second aspect, the first charge signals and the second charge signals may be signals corresponding to the combined charge amount read out by the second switching elements according to signals output to the plurality of second scan lines; the third charge signals may be signals corresponding to the charges read out by the first switching elements according to signals output by the plurality of first scan lines that are output according to the signal output from the plurality of second scan lines; and the fourth charge signals may be signals corresponding to the charges read out by the first switching elements of the plurality of pixels according to signals output by the plurality of first scan lines.

In a fifth aspect of the present invention, in the above aspects, the plurality of second charge amplifiers may integrate the second charge signals during a period of the second period corresponding to the first period, and may integrate the third charge signals during the second period after a period equivalent to the first period has elapsed.

In a sixth aspect of the present invention, in the third aspect, combinations of the pixels configuring respective pixel groups may be determined such that, when a plurality of hexagonal shaped regions are formed adjacent to each other, the plurality of hexagonal shape regions results in a honeycomb pattern array, wherein each of the hexagonal shape regions are formed by including inside one center of gravity of a region surrounded by an outline of the plurality of pixel groups configured by the respective 3 pixels, and by connecting together 6 individual centers of gravity present at the periphery of the one center of gravity.

In a seventh aspect of the present invention, in the above aspects, the hexagonal shaped pixel regions may be each formed in a regular hexagonal shape.

In an eighth aspect of the present invention, in the first to the sixth aspects, the hexagonal shaped pixel regions may be each formed in a flattened hexagonal shape.

In a ninth aspect of the present invention, in the eighth aspect, the hexagonal shaped pixel regions may be formed flattened such that one diagonal line out of 3 diagonal lines passing through the center of each of the pixel regions is shorter than the other two diagonal lines, and the other two diagonal lines are of equal length to each other.

In a tenth aspect of the present invention, in the first or the second aspect, the plurality of data lines may be disposed bent along one portion of the hexagonal shaped pixel region periphery.

In an eleventh aspect of the present invention, in the above aspects, the sensor portion may include a semiconductor film that receives irradiation of radiation and generates charges, the charges may be accumulated in a storage capacitor provided in each of the plurality of pixels, and the charges accumulated in the storage capacitor may read out by the first switching element and the second switching element.

In a twelfth aspect of the present invention, in the first to the tenth aspects, the sensor portion may include a scintillator that converts the radiation that has been irradiated into visible light, and after the converted visible light has been converted into charges by a semiconductor layer, the charges may be read out by the first switching element and the second switching element.

In a thirteenth aspect of the present invention, in the eleventh aspect, may further include a plurality of common lines that connect together one electrode of each of the storage capacitors and that fixes the electrodes to a specific electrical potential.

In a fourteenth aspect of the present invention, in the thirteenth aspect, the plurality of common lines may be connected to the plurality of data lines through the storage capacitors, the first switching elements, and the second switching elements.

In a fifteenth aspect of the present invention, in the thirteenth aspect, the plurality of first scan lines, the plurality of second scan lines, the plurality of data lines, the plurality of common lines, the first switching elements and the second switching elements may be disposed at a lower layer side of the sensor portion.

A sixteenth aspect of the present invention is a radiographic imaging apparatus including the radiographic image detector of the above aspects, and that images a radiographic image with the radiographic image detector.

A seventeenth aspect of the present invention is a radiographic imaging system including: the above radiographic imaging apparatus; and a control section that instructs the radiographic imaging apparatus to perform imaging of a radiographic image and acquires a radiographic image from the radiographic imaging apparatus, wherein the control section includes a switching section that, based on an external instruction, switches between a first image acquisition method that acquires pixel data in single-pixel units of a radiographic image detection device, and a second image acquisition method that acquires image data in multi-pixel units of the radiographic image detection device.

Thus, according to the above aspects, the present invention may maintain an even resolution before and after combining the charges of the pixel groups configured from plural pixels in each of the horizontal, vertical and diagonal directions.

BRIEF DESCRIPTION OF THE DRAWINGS

Exemplary embodiments of the present invention will be described in detail based on the following figures, wherein.

DETAILED DESCRIPTION OF THE INVENTION

Figure 1:
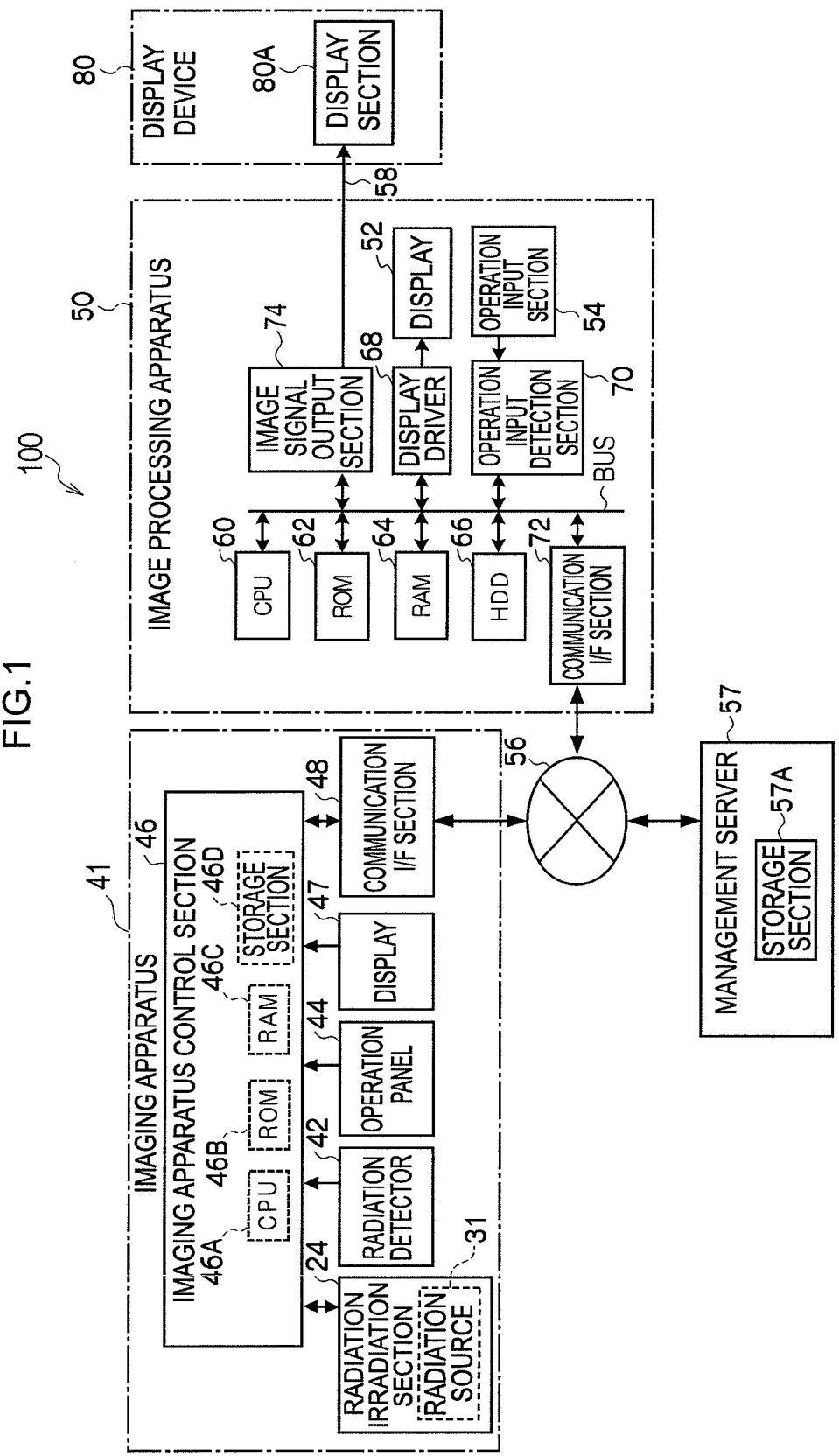
FIG. 1 is a block diagram illustrating a configuration of a radiographic imaging system according to an exemplary embodiment of the present invention.

Explanation follows regarding an exemplary embodiment of the present invention, with reference to the drawings. FIG.

1 is a block diagram illustrating a configuration of a radiographic imaging system 100 according to an exemplary embodiment of the present invention. The radiographic imaging system 100 includes an imaging apparatus 41 that images radiographic images, an image processing apparatus 50 that performs image processing on image data expressing imaged radiographic images, and a display device 80 for displaying a subject image expressed by the image data that has been subjected to image processing.

The imaging apparatus 41 includes a radiation irradiation section 24, a radiation detector 42 that detects a radiographic image, an operation panel 44 that is input with exposure conditions including data, such as, tube voltage, tube current, irradiation duration, imaging conditions, various operation data and various operation instructions, an imaging apparatus control section 46 that controls the operation of the apparatus overall, a display 47 that displays such displays as an operation menu and various information, and a communication I/F section 48 that is connected to a network 56 such as a LAN and that transmits and receives various data to and from other devices connected to the network 56. The imaging apparatus 41 according to the present exemplary embodiment is configured capable of switching between a video imaging mode that successively images radiographic images (video imaging) and a still imaging mode that performs still imaging. The imaging mode can be input as one of the imaging conditions to the imaging apparatus 41 from the operation panel 44. The imaging apparatus 41 performs video imaging or still imaging according to the imaging mode input through the operation panel 44.

The imaging apparatus control section 46 includes a CPU 46A, ROM 46B, RAM 46C and a non-volatile storage section 46D configured, for example, from a HDD or flash memory. The imaging apparatus control section 46 is connected to the radiation irradiation section 24, the radiation detector 42, the operation panel 44, the display 47 and the communication I/F section 48 through a bus (not shown in the drawings). Programs, such as a program for execution by the CPU 46A, are stored in the storage section 46D. Data such as image data (digital data) expressing radiographic images is stored in the storage section 46D. For example, when the imaging apparatus 41 of the present exemplary embodiment is employed for mammography, radiographic image data obtained by imaging the breast of a subject is stored in the storage section 46D.

When irradiated with radiation from the radiation source 31 of the radiation irradiation section 24 according to the exposure conditions, the radiation detector 42 detects the radiation and outputs image data expressing a radiographic image to the imaging apparatus control section 46. Details regarding the configuration of the radiation detector 42 are given later.

The imaging apparatus control section 46 is capable of communicating with the image processing apparatus 50 through the communication I/F section 48 and the network 56, and the imaging apparatus control section 46 performs transmission and reception of various data to and from the image processing apparatus 50. A management server 57 is also connected to the network 56. The management server 57 is configured including a storage section 57A that stores specific management data. The imaging apparatus control section 46 is enabled for communication with the management server 57 through the communication I/F section 48 and the network 56.

The image processing apparatus 50 is configured as a server computer and includes a display 52 that displays for example an operation menu and various data, and an operation input section 54 configured including plural keys for inputting various data and operation instructions. The image processing apparatus 50 includes a CPU 60 for controlling the apparatus operation overall, ROM 62 that is pre-stored with various programs including a control program, RAM 64 for temporary storage of various data, a HDD 66 for storing and retaining various data, a display driver 68 for controlling the display of various data on the display 52, an operation input detection section 70 for detecting operation states with respect to the operation input section 54, a communication I/F section 72 that is connected to the imaging apparatus 41 through the network 56 and that performs transmission and reception of various data to and from the imaging apparatus 41, and an image signal output section 74 that outputs image data through a display cable 58 to the display device 80. The image processing apparatus 50 acquires image data (digital data) expressing radiographic images stored in the storage section 46D from the imaging apparatus 41, via the communication I/F section 72.

The CPU 60, the ROM 62, the RAM 64, the HDD 66, the display driver 68, the operation input detection section 70, the communication I/F section 72 and the image signal output section 74 are mutually connected through a system BUS. The CPU 60 is accordingly able to access the ROM 62, the RAM 64 and the HDD 66. The CPU 60 is capable of performing various control, such as controlling display of various data on the display 52 through the display driver 68, controlling transmission and reception of various data to and from the imaging apparatus 41 through the communication I/F section 72, and controlling image display on a display section 80A of the display device 80 through the image signal output section 74. The CPU 60 is also capable of ascertaining user operation states to the operation input section 54 through the operation input detection section 70.

Figure 2:
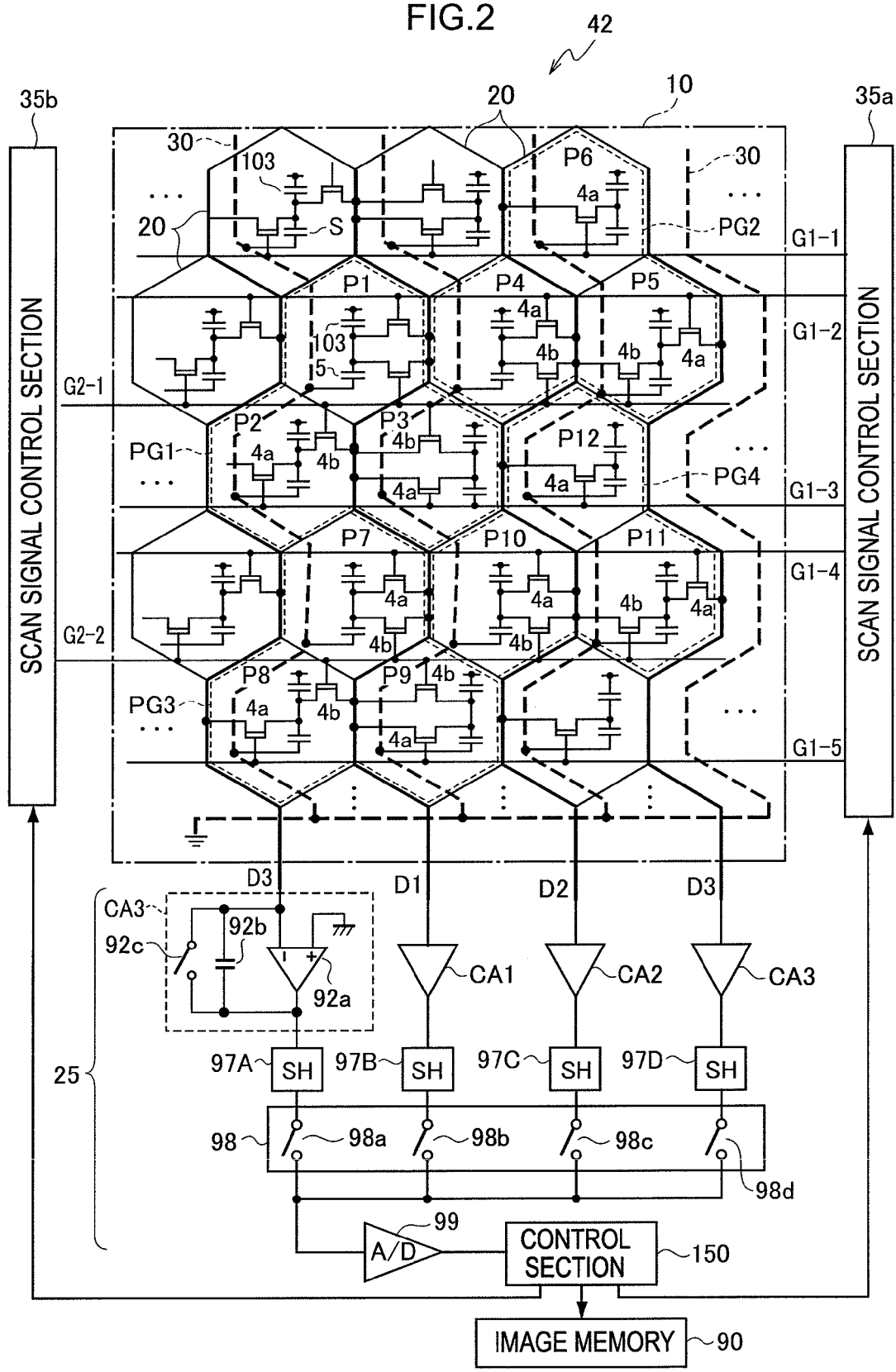
FIG. 2 is a drawing illustrating an electrical configuration of a radiation detector of an imaging apparatus according to an exemplary embodiment.

FIG. 2 illustrates an electrical configuration of a radiation detector of an imaging apparatus according to the present exemplary embodiment. A radiation detection element 10 of the radiation detector 42 illustrated in FIG. 2 is configured with plural pixels 20 that have hexagonal shaped pixel regions arrayed adjacently in a two dimensional honeycomb pattern, so as to configure a region that is substantially rectangular shaped overall. Each of the pixels 20 is configured including a sensor portion 103 that receives radiation (X-rays) that has been irradiated and generates charges, a charge storage capacitor 5 that accumulates the charges that have been generated in the sensor portion 103, and two thin film transistors (also referred to as TFT switches) 4a, 4b for reading the charges accumulated in the charge storage capacitors 5.

Note that out of the plural pixels 20, for example pixels P6, P12 and so on each only have the TFT switch 4a as a transistor for reading charges accumulated in the charge storage capacitor in each of the pixels due to the relationship to the timing for reading charges in an imaging mode, described later.

Note that, disposing the pixels 20 in a honeycomb pattern means that the pixels 20 having hexagonal shaped pixel regions of the same size are arrayed in a first pixel row and pixels 20 having hexagonal shaped pixel regions of the same size as the first pixel row pixels 20 are arrayed in a second pixel row, and the first pixel row and the second pixel row are repeated along the column direction (the vertical direction in FIG. 2). The pixels 20 in the first pixel row are arrayed in a row direction (the horizontal direction in FIG. 2) such that one side of mutually adjacent pixels are in adjacent contact with each other. The pixels 20 in the second pixel row are arrayed in the row direction such that two adjoining sides of each of the second pixel row pixels 20 are respectively in adjacent contact with two neighboring sides from mutually adjacent pixels in the first pixel row. The pixels 20 of the second pixel rows are disposed aligned between adjacent pixels of the first pixel rows, such that the pixels 20 of the second pixel rows are displaced in the row direction from the pixels 20 in the first pixel rows by ½ the array pitch of the first pixel row pixels 20.

The radiation detector 42 includes first scan lines G1-1 to G1-5 (also referred to as first scan lines G1) that are connected to the gate terminals of the TFT switches 4a provided in each of the pixels 20 in order to perform ON/OFF control of the TFT switches 4a, second scan lines G2-1, G2-2 (also referred to as second scan lines G2) that are connected to the gate terminals of the TFT switches 4b in order to perform ON/OFF control of the TFT switches 4b, plural data lines D1 to D3 that read charges generated in the sensor portions 103 that have been accumulated in the charge storage capacitors 5 (also referred to as data lines D or as data lines 3), and common ground lines 30.

In FIG. 2, for ease of explanation and illustration, an example is shown of a configuration disposed with 5 of the first scan lines G1, 2 of the second scan lines G2, 4 of the data lines D, and 4 of the common ground lines 30. In general when, for example, there are m×n individual pixels 20 disposed in the row direction and the column direction (wherein m and n are positive integers), m of the first scan lines G1 and n of the data lines D are provided. As described later, the radiation detection element 10 of the radiation detector 42 employs a radiation-charge conversion material such as amorphous selenium in a configuration that performs direct conversion of radiation into charges. Note that each of the sensor portions 103 of the pixels 20 is connected to common lines, not shown in the drawings, in a configuration in which a bias voltage is applied from a power source (not shown in the drawings) through the common lines.

In the radiation detector 42, the scan lines G1, G2 are disposed so as to intersect with the data lines D and the common ground lines 30. The data lines D are disposed along the peripheral edges of the pixels 20 with hexagonal shaped pixel regions in a zigzag pattern (so as to meander) so as to bypass these pixels 20. Namely, the data lines D extend in the column direction while running along 3 contiguous sides out of the peripheral edges (6 sides) of each of the individual pixels 20. The common ground lines 30 are also disposed in a zigzag pattern (so as to meaner) to keep away from the TFT switches 4a, 4b of each of the pixels 20.

The gate electrodes of the TFT switches 4a are connected to the first scan lines G1, and the gate electrodes of the TFT switches 4b are connected to the second scan lines G2. Either the drain electrodes or the source electrodes of the TFT switches 4a, 4b are connected to one of the electrodes of the charge storage capacitors 5, and the other out of the drain electrodes and the source electrodes are connected to the data lines D.

A control section 150 of the radiation detector 42 outputs control signals expressing signal detection timing and control signals expressing scan signal output timing to the scan signal control sections 35a, 35b. On receipt of the control signals from the control section 150, the scan signal control section 35a outputs signals to the first scan lines G1-1 to G1-5 for switching the TFT switches 4a ON/OFF. The scan signal control section 35b also outputs signals to the second scan lines G2-1, G2-2 for switching the TFT switches 4b ON/OFF.

For example, when imaging a radiographic image, during irradiation with external radiation (X-ray) an OFF signal is output to the first scan lines G1 and each of the TFT switches 4a is switched OFF, and an OFF signal is output to the second scan lines G2, switching each of the TFT switches 4b OFF. The charges generated in the sensor portion 103 are accordingly accumulated in each of the charge storage capacitors 5.

When reading an image, in the case of a still image for example, an ON signal is output in sequence one line at a time to the first scan lines G1, switching the TFT switches 4a in each of the pixels 20 ON. Or, for example when reading a video image, an ON signal is output in sequence one line at a time to the second scan lines G2, switching ON the TFT switches 4b of plural pixels in pixel groups (described later), and an ON signal is also output to specific first scan lines G1, switching ON the TFT switches 4a inside the pixels 20. The charges accumulated in each of the charge storage capacitors 5 are thereby read as electrical signals, and a radiographic image is obtained by converting the read electrical signals into digital data.

The radiation detector 42 is equipped with variable gain pre-amplifiers (also referred to as charge amplifiers or integrating amplifiers) CA1 to CA3 corresponded one for each of the data lines D1 to D3 as shown in FIG. 2. Sample-and-hold (SH) circuits 97A to 97D are also disposed in the radiation detector 42 at the output side of each of the charge amplifiers CA1 to CA3. The radiation detector 42 is configured with plural data lines disposed in repeating units of data lines D1 to D3, and the plural charge amplifiers are disposed in repeating units of charge amplifiers CA1 to CA3 corresponding thereto. The charge amplifiers CA1 to CA3 are each configured including an operational amplifier 92a with grounded positive input side, a condenser 92b connected in parallel across the negative input side and the output side of the operational amplifier 92a, and a reset switch 92c. The reset switch 92c is switched by the control section 150. The radiation detector 42 is also equipped with a multiplexor 98 and an analogue to digital (A/D) converter 99.

Note that sampling timings of the sample-and-hold circuit 97A to 97D and selection outputs by switches 98a to 98d provided to the multiplexor 98 are also switched by the control section 150. In FIG. 2 the multiplexor 98 is configured combining together 4 pixels into 1, however there is no limitation thereto. For example, the multiplexor 98 may be configured to match the repeating units of the data lines D1 to D3 described above, with 3 pixels combining into 1.

Figure 3:
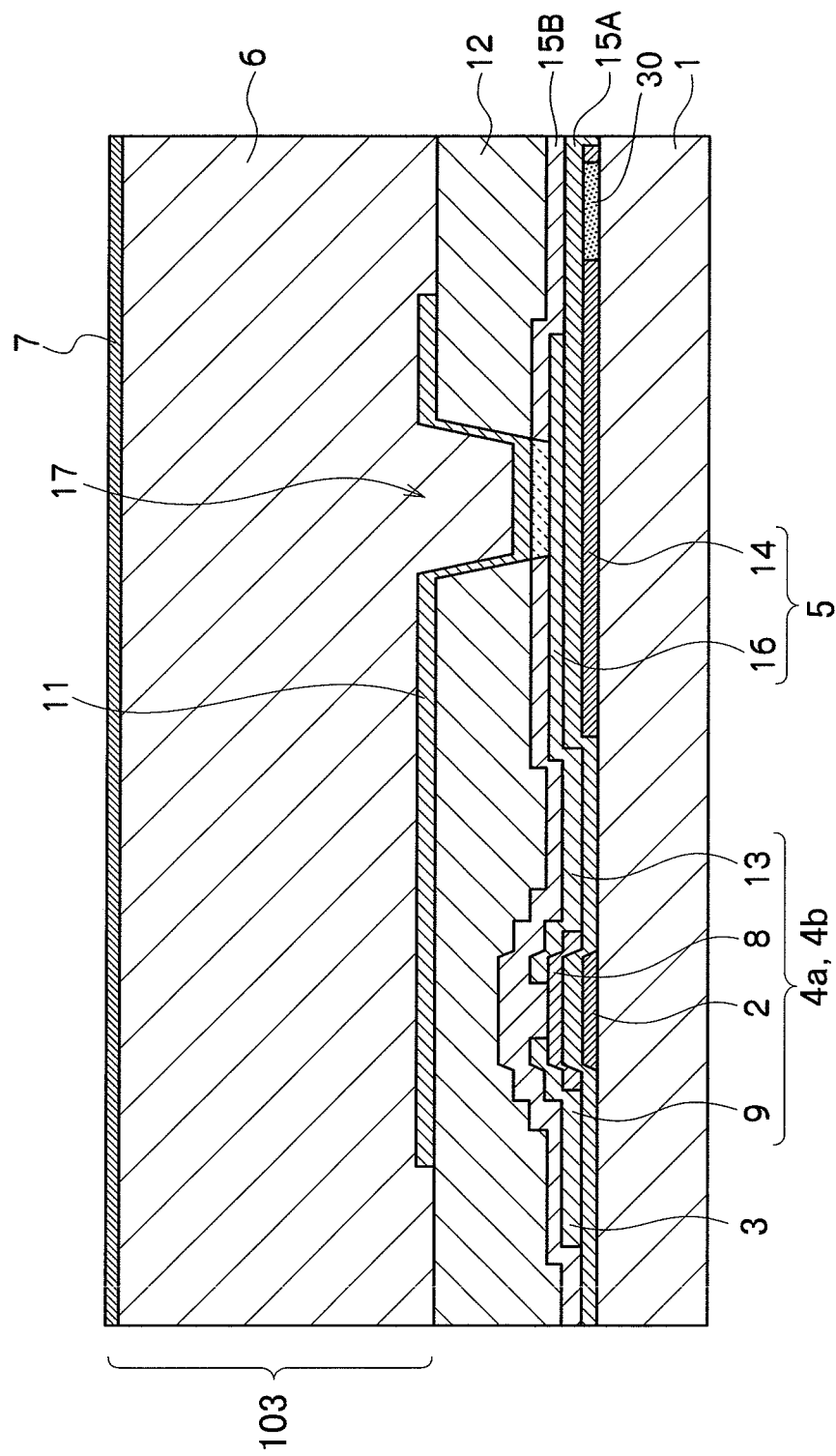
FIG. 3 is a drawing illustrating a partial cross-sectional view of a radiation detection element of a radiation detector according to an exemplary embodiment.

FIG. 3 illustrates a partial cross-sectional view of a single pixel of a radiation detection element of a radiation detector according to the first exemplary embodiment. The radiation detection element 10 of the radiation detector 42 has, as shown in FIG. 3, a structure in which gate electrodes 2, scan lines (not shown in FIG. 3) and storage capacitor lower electrodes 14 are formed as a gate wiring layer on an insulating substrate 1. A wiring layer (also referred to as a source wiring layer) formed with source electrodes 9, drain electrodes 13, signal lines 3, and storage capacitor upper electrodes 16 is formed using a layered film of, for example, Al or Cu, or mainly of Al or Cu. An impurity doped semiconductor layer (not shown in the drawings) such as impurity doped amorphous silicon is formed between semiconductor active layers 8 and the source electrodes 9 and the drain electrodes 13. Note that the source electrodes 9 and the drain electrodes 13 are reversed in the TFT switches 4a, 4b according to the polarity of the charges collected and accumulated by a lower electrode 11, described later.

The gate wiring layer for the gate electrodes 2 is formed using a layered film of, for example, Al or Cu, or mainly of Al or Cu. An insulating film 15A is formed on one face on the gate wiring layer, and the locations of the insulating film 15A above the gate electrodes 2 act as gate insulation films for the TFT switches 4a, 4b. The insulating film 15A is, for example, configured from SiNx, and is formed, for example, by a Chemical Vapor Deposition (CVD) film forming process. The semiconductor active layers 8 are formed with island shapes on the insulation film 15A above each of the gate electrodes 2. The semiconductor active layers 8 are channel portions of the TFT switches 4a, 4b and are, for example, formed from an amorphous silicon film.

The source electrodes 9 and the drain electrodes 13 are formed in a layer above the gate electrodes 2. In the wiring layer in which the source electrodes 9 and the drain electrodes 13 are formed, the data lines 3 are also formed together with the source electrodes 9 and the drain electrodes 13. The storage capacitor upper electrodes 16 are also formed at positions on the insulating film 15A corresponding to the storage capacitor lower electrodes 14. The drain electrodes 13 are connected to the storage capacitor upper electrodes 16. The data lines 3 are disposed running along the peripheral edges of the pixels 20 in the manner described above, bent so as to bypass between one pixel and an adjacent pixel. The data lines 3 are connected to the source electrodes 9 formed to the pixels 20 in each of the pixel rows.

A TFT protection layer 15B is formed over substantially the whole surface (substantially all regions) of the region where the pixels are provided on the substrate 1 so as to cover the source wiring layer. The TFT protection layer 15B is formed, for example, from a material such as $SiN_x$ by, for example, a CVD film forming method. A coated interlayer insulating film 12 is then formed on the TFT protection layer 15B. The interlayer insulating film 12 is formed from a low permittivity (specific permittivity $\epsilon_r$=2 to 4) photosensitive organic material (examples of such materials include positive working photosensitive acrylic resin materials with a base polymer formed by copolymerizing methacrylic acid and glycidyl methacrylate, mixed with a naphthoquinone diazide positive working photosensitive agent) at a film thickness of 1 μm to 4 μm.

In the radiation detector 42 according to the present exemplary embodiment, inter-metal capacitance between metal disposed in the layers above the interlayer insulating film 12 and below the interlayer insulating film 12 is suppressed to be small by the interlayer insulating film 12. Generally the materials of the interlayer insulating film 12 also function as a flattening film, exhibiting an effect of flattening out steps in the layers below. In the radiation detection device 10 of the radiation detector 42, contact holes 17 are formed in the interlayer insulating film 12 and the TFT protection layer 15B at locations corresponding to the storage capacitor upper electrodes 16.

Lower electrodes 11 of each of the sensor portions 103 are formed on the interlayer insulating film 12 for each of the pixels 20, so as to cover the pixel region while also filling each of the contact holes 17. The lower electrodes 11 are formed from an amorphous transparent conducting oxide film (ITO) and are connected to the storage capacitor upper electrodes 16 through the contact holes 17. As a result, the lower electrodes 11 and the TFT switches 4a, 4b are electrically connected through the storage capacitor upper electrodes 16. Note that while the lower electrodes 11 are preferably formed in shapes to match the shapes of the pixel regions of the pixels 20, there is no limitation thereto. For example, when the pixel regions of the pixels 20 are regular hexagonal shaped, the lower electrodes 11 are preferably formed with slightly smaller regular hexagonal shapes so as not to touch the lower electrodes of adjacent pixels. Similarly, when the pixel regions of the pixels 20 are formed in flattened hexagonal shapes the lower electrodes 11 are preferably formed in slightly smaller hexagonal shapes. As long as the pixel placement of the lower electrodes configures a hexagonal lattice, configuration may be made with beveled corner hexagonal shaped or square shaped lower electrodes 11.

A photoelectric conversion layer 6 is uniformly formed on the lower electrodes 11 over substantially the entire surface of the pixel region where the pixels 20 are provided on the substrate 1. The photoelectric conversion layer 6 generates charges (electrons-holes) due to irradiation of radiation such as X-rays. In other words, the photoelectric conversion layer 6 has electrical conduction properties and is employed to convert image data from radiation into charge data. For example, the photoelectric conversion layer 6 may be formed from amorphous selenium (a-Se) having selenium as the main component and a film thickness of 100 μm to 1000 μm. Here, the main component means contained at a ratio of 50% of more. An upper electrode 7 is formed on the photoelectric conversion layer 6. The upper electrode 7 is connected to a bias power source (not shown in the drawings) and supplies a bias voltage (for example several kV) from the bias power source. The scan lines G1, G2, the data lines 3, the common ground lines 30 and the TFT switches 4a, 4b are disposed at a lower layer side of the sensor portions 103 configured by the photoelectric conversion layer 6.

In the radiation detection device of the radiation detector, the gate electrodes 2, the first and second scan lines G1, G2 and the storage capacitor lower electrodes 14 are formed as the gate wiring layer on the insulating substrate 1, and the common ground lines 30 are formed on the insulating substrate 1, for example in the same metal layer as the storage capacitor lower electrodes 14.

Explanation next follows regarding operation of the radiation detector 42 according to the present exemplary embodiment. Charges (electron-hole pairs) are generated in the photoelectric conversion layer 6 when X-rays are irradiated onto the photoelectric conversion layer 6 in a state in which a bias voltage is being applied across the upper electrode 7 and the storage capacitor lower electrodes 14. The photoelectric conversion layer 6 and the charge storage capacitors 5 are electrically connected in series, and so electrons generated in the photoelectric conversion layer 6 migrate to the +(plus) electrode side and holes migrate to the −(minus) electrode side.

During image detection, OFF signals (0V) are output from the scan signal control sections 35a, 35b to all the scan lines G1, G2, applying a negative bias to the gate electrodes of the TFT switches 4a, 4b. Each of the TFT switches 4a, 4b are thereby maintained in an OFF state. As a result, electrons generated in the photoelectric conversion layer 6 are collected by the lower electrodes 11, and accumulated in the charge storage capacitors 5. The photoelectric conversion layer 6 generates a charge amount according to the amount of radiation irradiated, and so, charges according to image data carried by the radiation are accumulated in the charge storage capacitors 5 of each of the pixels. Note that the charge storage capacitors 5 need to be given a larger capacitance than the capacitance formed by the photoelectric conversion layer 6 due to the voltage of several kV referred to above being applied across the upper electrode 7 and the storage capacitor lower electrodes 14.

During image reading, the radiation detector 42 performs in a still imaging mode or a video imaging mode according to instruction from the image processing apparatus 50 as described above. When instruction was for the still imaging mode, the control section 150 controls the scan signal control section 35b such that gate control signals are output from the second scan lines G2-1, G2-2 for switching the TFT switches 4b in each of the pixels 20 OFF. The control section 150 also controls the scan signal control section 35a to apply an ON signal for example with a voltage of +10 to 20V in sequence from the first scan lines G1-1 to G1-5 to the gates of each of the TFT switches 4a in order to switch the TFT switches 4a in each of the pixels 20 ON. The TFT switches 4a in each of the pixels 20 are thereby switched to an ON state in sequence for each of the pixel rows, charges are read from the sensor portions 103 by the TFT switches 4a, and signals corresponding to these charges are output to the data lines D.

Thus in the radiation detector 42, in the still imaging mode, in all of the data lines D1 to D3 charge signals flow corresponding to each of the pixels 20 in each of the pixel rows. Image data expressing an image representing radiation irradiated onto the radiation detection element 10 of the radiation detector 42 can accordingly be obtained. In a signal processing section 25 the charge signals are then converted into digital signals, and a radiographic image based on the image data corresponding to the charge signals is generated.

Figure 4:
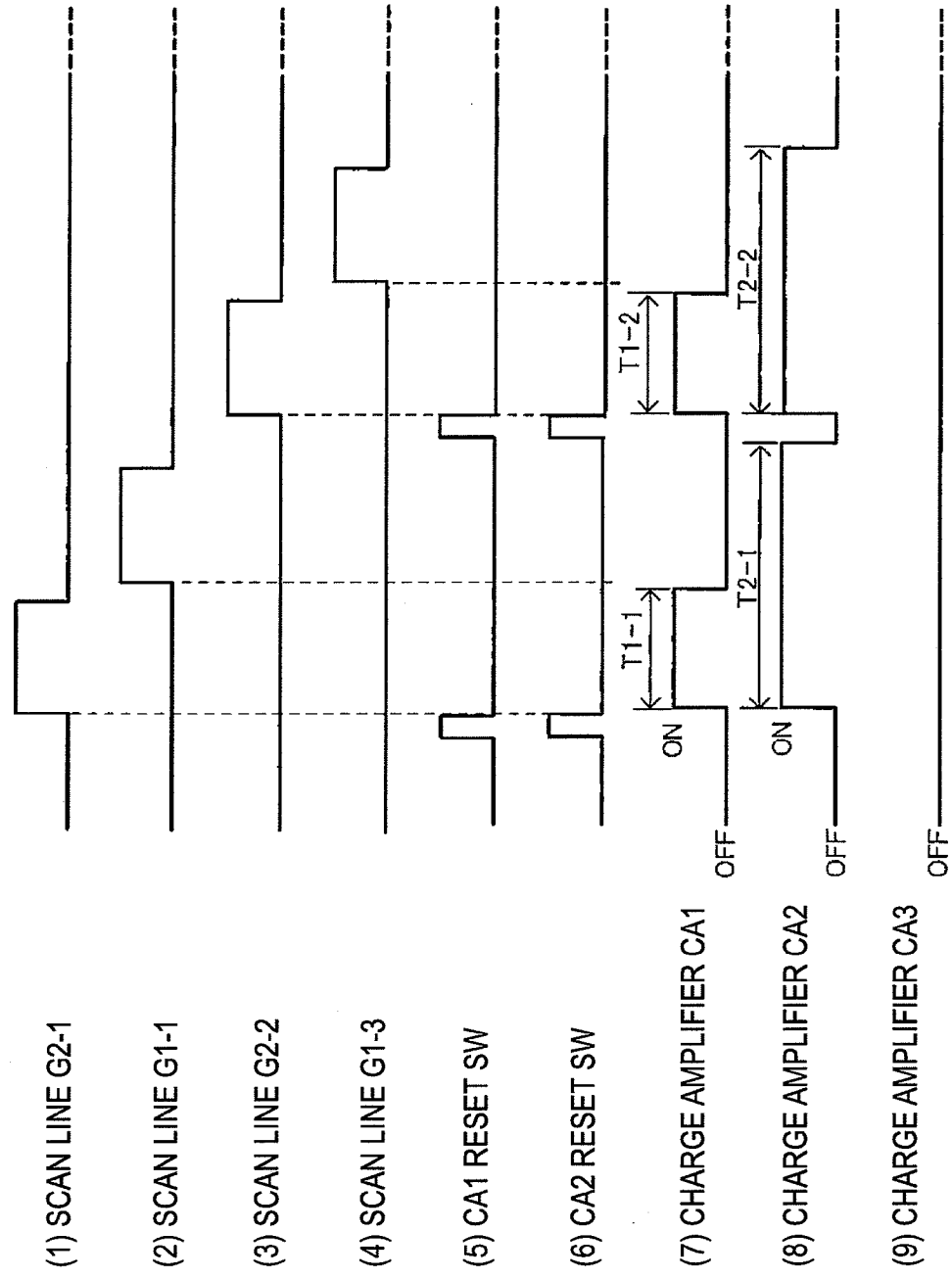
FIG. 4 is a drawing illustrating an operation timing chart of a radiation detector during binning processing.

Explanation follows regarding the video imaging mode in the radiation detector according to the present exemplary embodiment, with reference to the operation timing chart shown in FIG. 4. Out of the plural pixels 20 in the radiation detector 42 according to the present exemplary embodiment, the gate terminals of each of the TFT switches 4b disposed in the three pixels P1 to P3 surrounded by a dashed line in FIG. 2, for example, are connected to the second scan line G2-1. The gate terminals of each of the TFT switches 4b disposed in the pixels P4, P5 out of the three pixels P4 to P6 similarly surrounded by a dashed line are also connected to the second scan line G2-1.

Similarly, the gate terminals of each of the TFT switches 4b disposed in the three pixels P7 to P9 are connected to the second scan line G2-2, and the gate terminals of each of the TFT switches 4b disposed in the pixels P10, P11 out of the three pixels P10 to P12 are also connected to the second scan line G2-2.

The pixels P1 to P3 are collectively referred to here as pixel group PG1. The pixels P4 to P6 are collectively referred to as pixel group PG2, the pixels P7 to P9 are collectively referred to as pixel group PG3, and the pixels P10 to P12 are collectively referred to as pixel group PG4. While simplified in FIG. 2, the radiation detection element 10 is also configured with plural other pixel groups of three specific pixels, adjacent to the pixel groups PG1, PG2 etc. (see for example FIG. 5). Taking the pixel groups PG1, PG2 as an example, in these pixel groups the 3 pixels of the pixel group PG1 (P1 to P3), and 3 pixels made up from 2 pixels of pixel group PG2 (P4, P5) and 1 pixel of pixel group PG2 (P6), configure pixel group repeating units (each of a total of 6 pixels). The repeating units include 3 successive pixels in the same pixel row direction (in this case P1, P4, P5), 2 successive pixels along a pixel row direction disposed adjacent in the pixel column direction below these 3 successive pixels (in this case P2, P3), and 1 pixel disposed adjacent in the pixel column direction above these 3 successive pixels (in this case P6). Each of the 3 pixels of the respective pixel groups PG1, PG2 are disposed such that 2 neighboring sides of each of the pixels are respectively adjacent to 1 neighboring side of each of the remaining 2 pixels.

In the radiation detector 42 of the present exemplary embodiment, treating the pixels P1 to P6 described above as a single pixel group unit, the radiation detection element 10 is configured by disposing such pixel group units successively along the horizontal and vertical directions of FIG. 2. In other words, it could also be said that in the radiation detector 42, treating the pixels P1 to P5 and the pixel P12 as a single pixel group unit, the radiation detection element 10 is configured by disposing such pixel group units successively along the horizontal and vertical directions of FIG. 2.

When the video imaging mode is instructed to the radiation detector 42, the control section 150 initially controls the scan signal control section 35a so as to output OFF signals from the first scan lines G1-1 to G1-5 to each of the gate electrodes of the TFT switches 4a of each of the pixels 20 to switch the TFT switches 4a of each of the pixels 20 OFF.

The control section 150 then outputs reset signals to short the reset switches of the charge amplifiers. For example, as shown in (5) and (6) of FIG. 4, reset signals are output to the charge amplifiers CA1, CA2, and the charges accumulated in the condensers of the charge amplifiers CA1, CA2 are discharged (reset).

The control section 150 then controls the scan signal control section 35b to output a scan signal (ON signal) using the second scan line G2-1. Specifically, as shown in (1) of FIG. 4, an ON signal is output for a specific period of time by the second scan line G2-1. The TFT switches 4b of the 3 individual pixels P1 to P3 of the pixel group PG1 are thereby switched ON. As a result, charge signals of the charges that have been accumulated in each of the charge storage capacitors 5 of the pixels P1 to P3 are combined inside the radiation detection element 10, and the combined charge signal of these 3 pixels flows out through the data line D1.

The electrical signal (3 pixels worth of combined charge signal) transmitted by the data line D1 is amplified by a predetermined amplification in the charge amplifier CA1 for a period of time shown in (7) of FIG. 4 (referred to as the integration period T1-1), and held in the sample-and-hold circuit 97B. Sampling of the charge signals is stopped as the integration period T1-1 elapses.

When an ON signal is output by the second scan line G2-1 ((1) of FIG. 4), the TFT switches 4b in the pixels P4, P5 of the pixel group PG2 are switched ON. As a result, a combined charge signal of charges accumulated in each of the charge storage capacitors of the pixels P4, P5 flows out through the data line D2. The electrical signal (the combined charge signal of pixels P4, P5) transmitted by the data line D2 is amplified by the charge amplifier CA2 for a period of time equivalent to the above integration period T1-1 within the integration period T2-1, as shown at (8) of FIG. 4, and held in the sample-and-hold circuit 97C. The control section 150 ends the integration period T1-1 when the output signal from the second scan line G2-1 has changed from ON to OFF, however the integration period T2-1 is continued, in a state in which the charge signals can continue to be accumulated and amplified (integrated) in the charge amplifier CA2.

The control section 150, after switching the output signal from the second scan line G2-1 to OFF then controls the scan signal control section 35a as shown in (2) of FIG. 4 such that the output signal from the first scan line G1-1 becomes ON. The TFT switches 4a in the pixels of the pixel row corresponding to the first scan line G1-1 are accordingly switched ON, and the charge signals read from these pixels flow out through each of the data lines. When this occurs, the charge amplifier CA2 is in a state capable of accumulating and amplifying (integrating) the charge signals as described above, however the charge amplifier CA1 is in a non-operational state. Note that, in the video imaging mode (during binning driving), since there are no signals flowing through the data lines D3, the control section 150 places the charge amplifier CA3 in a constant non-operational state, as shown in (9) of FIG. 4.

Hence, as shown in (8) of FIG. 4, in the integration period T2-1 after the period of time of the integration period T1-1 has elapsed, the charge signal of the pixel P6 of the pixel group PG2 flows out through the data line D2, and the charge signal of the pixel P6 is accumulated and amplified (integrated) in the charge amplifier CA2 connected to the data line D2. As a result, the charge signal of the pixel P6 is added to the previously accumulated and amplified (integrated) charge signals of the pixels P4, P5 in the charge amplifier CA2 in the integration period T2-1. The combined charge signal of the pixels P4 to P6 are then held in the sample-and-hold circuit 97C, and sampling is ended as the integration period T2-1 elapses.

As described above, when an ON signal is output by the second scan line G2-1 and an ON signal is output by the first scan line G1-1, similarly to with the pixel groups PG1, PG2, 3 specific pixels worth of combined charge signals are output to data lines by the plural other pixels following on in the row direction from the pixels of the pixel groups PG1, PG2.

The control section 150 continues the above processing, and performs binning processing for the pixel groups that are adjacent in the column direction to the pixel groups PG1, PG2 etc. (the pixel groups PG3, PG4 in FIG. 2). Namely, the control section 150, as shown in (5) and (6) of FIG. 4, sends reset signals to the charge amplifiers CA1, CA2 so as to discharge (reset) the charges that have accumulated in the condensers of these amplifiers. The control section 150, as shown in (3) of FIG. 4, controls the scan signal control section 35b so as to output a scan signal (ON signal) with the second scan line G2-2. The TFT switches 4b of the 3 individual pixels P7 to P9 of the pixel group PG3 are thereby switched ON, charge signals of charges accumulated in each of the charge storage capacitors 5 of the pixels P7 to P9 are combined in the radiation detection element 10, and a combined charge signal for the 3 pixels (P7 to P9) flows out in the data line D1.

The combined charge signal for 3 pixels is amplified by the charge amplifier CA1 during the integration period T1-2, as shown in (7) of FIG. 4, and held by the sample-and-hold circuit 97B. Then sampling of the charge signal is ended as the integration period T1-2 elapses.

When an ON signal is output by the second scan line G2-2, the TFT switches 4b in the pixels P10, P11 of the pixel group 4 are switched ON, and a combined charge signal of the charges accumulated in the pixels P10, P11 flows out in the data line D2. The combined charge signal is amplified by the charge amplifier CA2 for a period of time equivalent to the integration period T1-2 within the integration period T2-2, as shown in (8) of FIG. 4, and held in the sample-and-hold circuit 97C. In this case too, the control section 150 ends the integration period T1-2 when the output signal from the second scan line G2-2 has become OFF, the integration period T2-2 is not ended, and a state continues in which the charge signal can continue to be accumulated and amplified (integrated) in the charge amplifier CA2.

After the output signal from the second scan line G2-2 has become OFF, as shown in (4) of FIG. 4, the output signal from the first scan line G1-3 is switched ON. The TFT switches 4a in the pixel row corresponding to the first scan line G1-3 are thereby switched ON. When this occurs, the charge amplifier CA1 is not in an operational state, however the charge amplifier CA2 is maintained in a state capable of accumulating and amplifying (integrating) the charge signals as described above. Note that as described above, in video imaging mode (during binning driving) signals do not flow in the data line D3. Consequently, as shown in (9) of FIG. 4, the charge amplifier CA3 is constantly in a non-operational state during binning driving.

Hence, as shown in (8) of FIG. 4, for the period of time of the integration period T2-2 after the integration period T1-2 has elapsed, the charge signal of the pixel P12 of the pixel group PG4 flows in the data line D2, and the charge signal of the pixel P12 is accumulated and amplified (integrated) in the charge amplifier CA2 connected to the data line D2. As a result, in the charge amplifier CA2, during the integration period T2-2 the charge signal of the pixel P12 is added to the charge signals of the pixels P10, P11 previously accumulated and amplified (integrated) in the charge amplifier CA2. Then, the combined charge signal for the pixels P10 to P12 is held in the sample-and-hold circuit 97C, and sampling is ended as the integration period T2-2 elapses.

When ON signals are output by the second scan line G2-2 and the first scan line G1-3, similarly to with the pixel groups PG3, PG4, 3 specific pixels worth of combined charge signals are output to data lines by the plural other pixels following on in the row direction from the pixel groups PG3, PG4.

By the control section 150 driving the sample-and-hold circuits 97A to 97D for specific periods of time, the signal levels of the electrical signals that have been amplified by the variable gain charge amplifiers CA1 to CA3 are held in the sample-and-hold circuits. The charge signals respectively held in the individual sample-and-hold circuits are, after being selected in sequence by the multiplexer 98, converted into digital image data by the A/D converter 99. Note that the digital image data output from the A/D converter 99 is stored in sequence in an image memory 90. The image memory 90, for example, stores plural frames worth of imaged radiographic images as digital image data.

Thus, in the video imaging mode, in the respective plural pixel groups configured by bundles of 3 pre-specified pixels from the plural pixels configuring the radiation detection element 10, the charges accumulated in the 3 individual pixels are combined (binned) and charge signals corresponding to the charges combined through binning are output to the data lines. Then following on from controlling the second scan lines G2, by outputting ON signals from the odd numbered scan lines (G1-1, G1-3 etc.) out of the first scan lines G1 in FIG. 2, the charge signals of the remaining single pixels in the pixel groups for which 2 pixels worth of combined charge signals have already been acquired flow in the data lines. In the video imaging mode, an OFF signal is constantly output from the even numbered scan lines (G1-2, G1-4 etc.) out of the first scan lines G1.

Consequently, in the radiation detector according to the present exemplary embodiment, 3-pixel binning processing is performed for the pixels of specific pixel groups (PG2, PG4 etc.) by employing the same charge amplifier to add together and combine 2 pixels worth of the charge signals out of the 3 pixels configuring each of the pixel groups and then the charge signal of the remaining 1 pixel using shifted integration timings.

Figure 5:
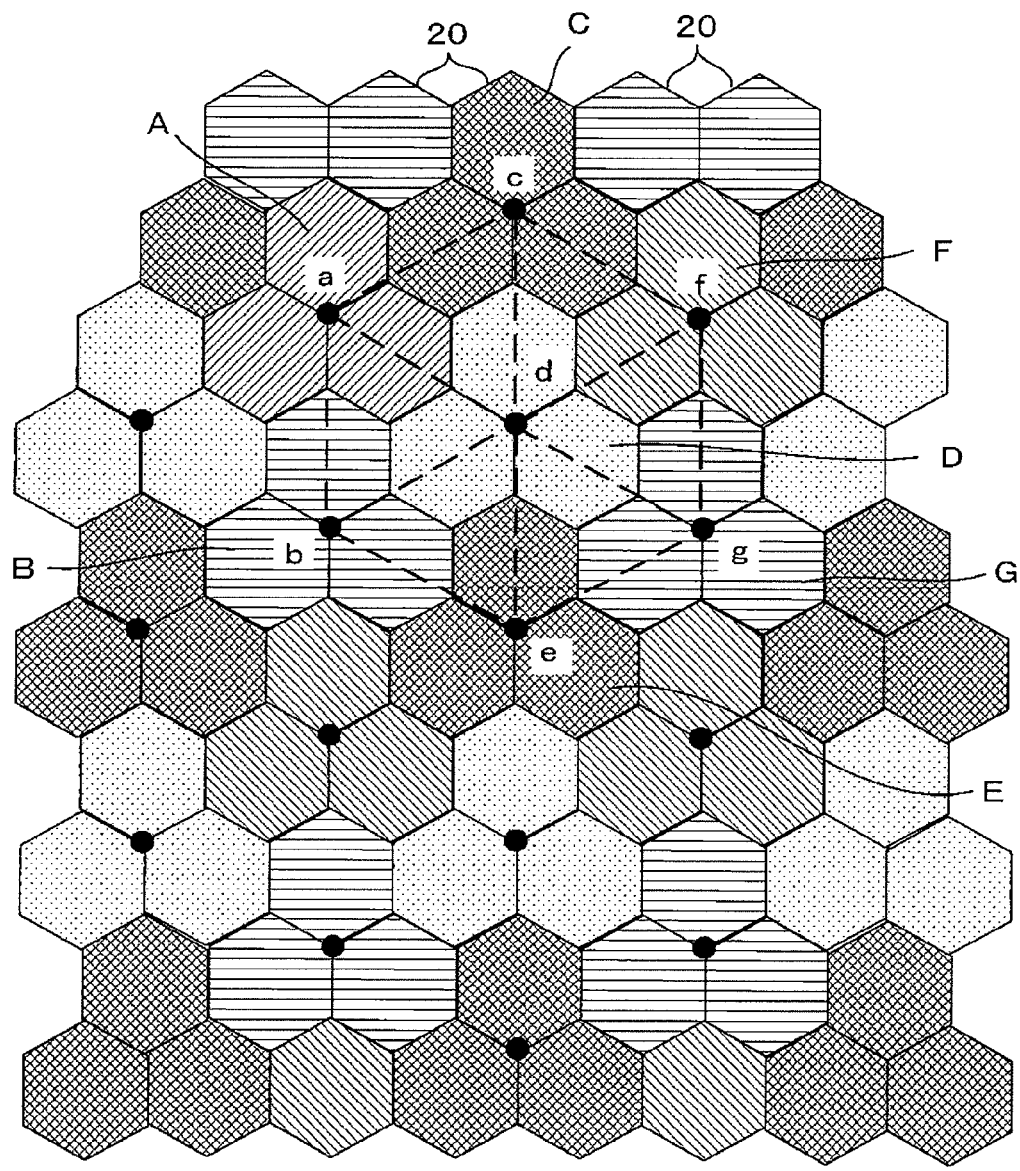
FIG. 5 is a drawing illustrating a layout of pixels and pixel groups subject to binning.

FIG. 5 illustrates a layout of pixels and pixel groups subjected to binning in the video imaging mode described above. In the example illustrated in FIG. 5, the radiation detection element 10 of the radiation detector 42 features pixel groups A, B, C, D, E, F, G each formed from 3 pixels as described above. Note that in FIG. 5, in order to facilitate discrimination between each of the pixel groups, the pattern of shading is changed for each of the pixels of mutually adjacent pixel groups. Each of the pixel groups here is configured by a combination of three individual pixels disposed such that two adjoining sides of each of the pixels are respectively mutually adjacent to one side of each of the other two pixels.

In the radiation detector 42 of the present exemplary embodiment, when the still imaging mode has been instructed as described above, the control section 150 switches ON the TFT switches 4a inside each of the pixels 20 of the radiation detector 42, the charges are read from each of the pixels, and signals corresponding to the charges are output in the data lines D. When this is performed, by employing the pixels with hexagonal shaped pixel regions as individual pixels of the radiation detection element 10 of the radiation detector 42, high resolution may be secured in each of the horizontal, vertical and diagonal directions.

In the video imaging mode however, the control section 150 switches ON the TFT switches 4*b* inside the 3 pixels configuring each of the pixel groups and binning is accordingly performed treating these 3 pixels as respective single pixels and combining the charge signals of the 3 pixels. The integration timing of the charge amplifiers is controlled and 3-pixel binning is also performed for the other pixel groups whose TFT switches 4*b* have been switched ON by the ON signal to these 3 pixels.

When 3-pixel binning is performed for each of the pixel groups, the positions of the center of gravity for each of the pixel groups A, B, C, D, E, F, G are positioned at the black dots indicated respectively as a, b, c, d, e, f, g in FIG. 5, and a regular hexagonal shape is formed with the center of gravity d of the pixel group D at the center by connecting the centers of gravity a-b-e-g-f-c-a of the other pixel groups. It can also be seen that the inter center of gravity distances of these pixel groups, namely the separations in the 6 directions d to a, d to b, d to e, d to g, d to f, and d to c, are all the same as each other. Thus by making the pixel regions of each of the pixels 20 a hexagonal shape, even resolution may be secured in each of the horizontal, vertical and diagonal directions before binning. Moreover, since a regular hexagonal shape is also formed by connecting together the centers of gravity of the pixel groups, even resolution may also be secured in each of the horizontal, vertical and diagonal directions after binning.

Namely, by employing the center of gravity a, b, c, d, e, f, g of each of the regions surrounded by the outlines of the pixel groups A, B, C, D, E, F, G, plural adjacent individual regions are formed with 1 center of gravity d at the inside and hexagonal shaped regions formed by the line segments connecting the 6 individual centers of gravity a, b, e, g, f, c present at the periphery of the center of gravity d. The combinations of each of the pixels in each of the pixel groups are determined such that the plural individual hexagonal shaped regions thus formed are arrayed in a honeycomb pattern. Accordingly, the present exemplary embodiment may suppress unevenness in each of the horizontal, vertical and diagonal directions of the pixel positions (the center of gravity positions of the pixel groups) after binning, enabling even resolution to be secured in each of the respective directions, similarly to in an image before binning.

Since the centers of gravity arrayed before binning and the hexagonal shaped regions formed by the centers of gravity arrayed after binning both give rise to a state with hexagonal shaped regions formed by the centers of gravity arrayed in a honeycomb pattern, processing may be performed with a similar algorithm when performing pixel density conversion after binning to when performing pixel density conversion without binning. Namely, the algorithm for pixel density conversion processing can be commonly employed both before and after binning, without preparing another separate algorithm for pixel density conversion processing after binning. In the image processing apparatus 50 a program for performing pixel density conversion on image data expressing radiographic images detected by the radiation detector 42 is stored on the ROM 62 and/or the HDD 66. The image data output to the display device 80 is accordingly image data after performing pixel density conversion.

Figure 6:
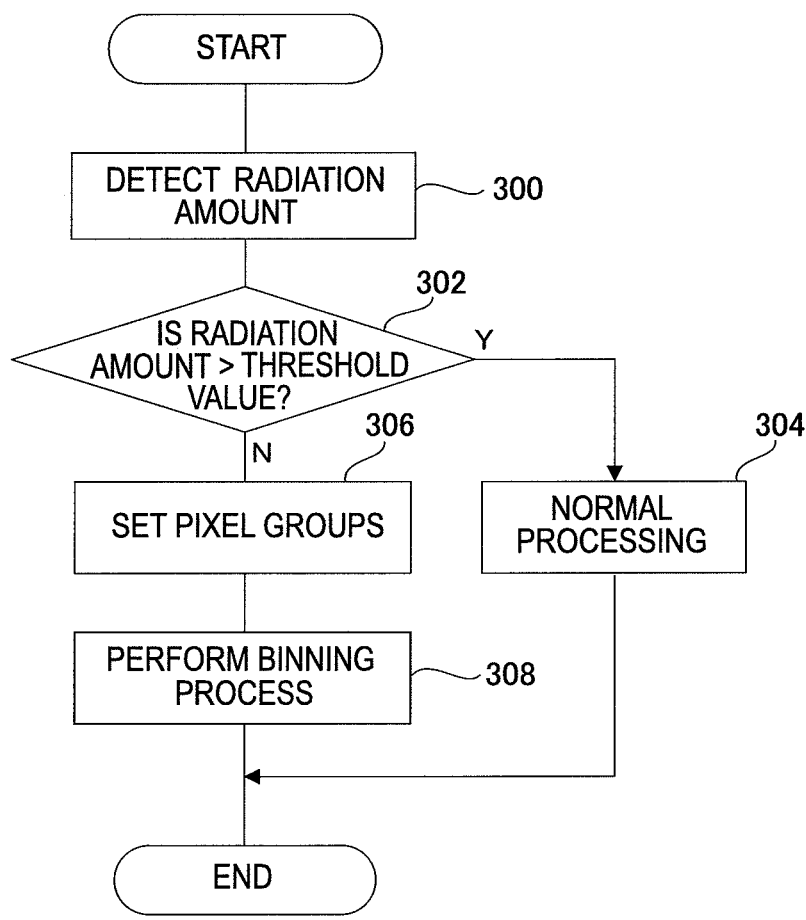
FIG. 6 is a flow chart showing an example of an imaging processing sequence of a radiographic imaging system according an exemplary embodiment.

FIG. 6 is a flow chart showing an example of an imaging processing sequence executed in the image processing apparatus 50 of a radiographic imaging system according to the present exemplary embodiment. At step 300 of FIG. 6, the amount of radiation irradiated from the radiation irradiation section 24 is detected in the radiation detector 42 of the imaging apparatus 41. Then at step 302, determination is made as to whether or not the radiation amount has exceeded a predetermined threshold value. It is determined that sufficient sensitively can be obtained for imaging (image S/N will be sufficient) when determined that the amount of radiation irradiated has exceeded the threshold value. Process then proceeds to step 304 where a control signal is transmitted to the respective plural pixels 20 and normal processing to read the signals of the charges individually accumulated in the storage capacitors is performed (still imaging mode).

However, when determined at step 302 that the amount of radiation irradiated is the threshold value or lower, it is considered that the S/N for the image obtained would be insufficient, processing proceeds to step 306 and processing is performed to image a high S/N image. Specifically, the pixel groups A, B, C, D, E etc. each formed from specific 3 pixels are set as described above. At step 308, a scan signal (ON signal) is output by the scan signal control section 35*b* to the second scan lines G2 to switch on the TFT switches 4*b* of each of the pixels disposed in the pixel groups A, B, C, D, E etc., and binning processing is performed to treat the 3 pixels of each of the pixel groups as a single pixel. Thus, if the amount of radiation irradiated is the threshold value or lower, a radiographic image with good S/N is obtained by combining the charge signals of plural pixels (binning) due to the consideration that otherwise there would be insufficient imaging sensitivity.

Note that, in the imaging processing shown in FIG. 6, process is performed in consideration of the S/N of the radiographic image that will be obtained according to the amount of radiation irradiated. However, there is no limitation thereto. For example, configuration may be made so as to switch between normal processing without binning and processing with binning, according to instruction for the still imaging mode or the video imaging mode, irrespective of the amount of radiation irradiated. Configuration may be made to perform the above switching according to the required resolution for imaging.

Namely, in a first mode (video imaging mode), plural first data lines out of the plural data lines D transmit charge signals (also referred to as first charge signals) corresponding to the combined charge signals of 3 pixels read out using the TFT switches 4*b* (also referred to as second switching elements) provided in the individual 3 mutually adjacent pixels in a pair of column direction adjacent pixel rows of the plural pixels 20. Plural second data lines out of the data lines D transmit charge signals (also referred to as second charge signals) corresponding to a combined charge amount of 2 pixels read out using the second switching elements provided in each of the 2 specific pixels mutually adjacent to each other along the pixel row direction of the above 3 pixels, and transmit a charge signal (also referred to as a third charge signal) read by the TFT switch 4*a* (also referred to as a first switching element) provided in 1 specific pixel that is pixel column direction adjacent to the above 2 pixels. In the first mode, out of the plural charge amplifiers CA connected to one end of each of the plural data lines, plural first charge amplifiers convert the first charge signals into voltage signals during a first period, and plural second charge amplifiers add together the second charge signal and the third charge signal during a second period and convert the sum into a voltage signal.

In a second mode (still imaging mode), all of the plural data lines D transmit charge signals (also referred to as fourth charge signals) corresponding to each of the charges of the plural pixels 20 are read by the TFT switches 4*a* (the first switching elements) provided in each of the plural pixels 20, and the plural charge amplifiers CA convert the fourth charge signals into voltage signals.

Thus in the present exemplary embodiment, for respective predetermined plural pixel groups each configured from 3 pixels out of the plural pixels with hexagonal shaped pixel regions arrayed in a honeycomb pattern in the radiation detector, binning processing is performed to read respective 3 pixels worth of charges in the radiation detection element of the radiation detector together, and to combine these charge signals. Furthermore, 3-pixel binning is performed for given pixel groups by adding 2 pixels worth of the charge signals out of the 3 pixels configuring these pixel groups and the charge signal of the remaining 1 pixels worth using the same charge amplifier with shifted integration timings.

In the present embodiment, the S/N is enhanced by increasing the charge amount collected by performing such multi-pixel (3-pixel) binning, enabling application to a video imaging mode demanding a high frame rate as well as enabling application to low sensitivity images generated by irradiating a small amount of radiation.

Moreover, combination of each of the pixels in each of the pixel groups is determined such that plural hexagonal shaped regions are arrayed in a honeycomb pattern. Each of the plural hexagonal shaped regions are formed by including inside 1 center of gravity of the region surrounded by the outlines of the pixel groups and the line segments connecting the 6 individual centers of gravity present at the periphery of the 1 center of gravity. Accordingly, unevenness of the pixel positions (the center of gravity position when plural pixels are treated a single pixel clump) after binning in each of the horizontal, vertical and diagonal directions may be suppressed, and even resolution may be secured in each of the respective directions, similarly to in an image before binning. As a result, a common integrated circuit (IC) may be employed for pixel density conversion before and after binning.

When imaging a video image, charges are read with pixel groups that are each configured from 3 pixels treated as single pixels, and binning processing is performed to combine the charges accumulated in each of the pixels configuring the pixel groups. Accordingly, although the resolution is lower than in a still image, the frame rate for reading charges from each pixel row can be made twice that of a still imaging mode (the frame period may be halved). In comparison to the number of rows when scan lines are provided for each of the pixel rows subject to binning, the number of scan lines may also be reduced. In other words, in the configuration of the radiation detector illustrated in FIG. 2, in comparison to the 5 scan lines required when binning is not performed, the total number of scan lines required for scanning the pixels, including performing scanning with binning, has previously been twice the 5 lines, i.e. 10 lines, however only 7 lines are required in the present exemplary embodiment.

In each of the above exemplary embodiments, the hexagonal shaped pixels of the radiation detection element may include regular hexagonal shaped pixels and substantially hexagonal shaped pixels that have their corners beveled. Moreover, for example, flattened hexagonal shaped pixels squashed in the top-bottom direction of the page of FIG. 2, and substantially hexagonal shaped pixels when viewed in plan view are also possible. Thus for flattened hexagonal shaped pixel regions, the relationships of the center of gravity separations and the six horizontal, vertical and diagonal directions can be maintained before and after binning processing.

In each of the above exemplary embodiments, explanation has been given of cases in which the present invention is applied to a direct-conversion-type radiation detector employing a radiation—charge conversion material such as amorphous selenium in a photoelectric conversion layer that absorbs radiation and converts the radiation into charge. However, the present invention is not limited thereto. For example, the present invention may be applied to an indirect-conversion-type radiation detector equipped with a scintillator that converts irradiated radiation into visible light.

In each of the above exemplary embodiments the common ground lines 30 are disposed on the insulating substrate 1, however there is no limitation thereto. For example, the common ground lines 30 may be disposed in any layer below the lower electrodes 11 as the pixel electrodes that collect charges generated in the photoelectric conversion layer 6. By so doing, the situation can be avoided in which the common ground lines 30 lower the irradiation efficiency of radiation irradiated onto the sensor portions 103.

In the above exemplary embodiments, as shown in for example FIG. 2, examples have been given of cases in which the scan signal control sections 35a, 35b are respectively disposed along the column direction (the vertical direction in FIG. 2) to the sides of the radiation detection element 10 of the radiation detector 42. However, placement of the scan signal control sections are not limited thereto. For example, in mammography applications, the scan signal control sections 35a, 35b may be provided along the column direction at one side of the radiation detection element 10, with the other side along the column direction configured at the chest wall side of the subject. In such cases, two individual general purpose gate ICs may be employed for the scan signal control sections 35a, 35b in a layered structure (double-layer) with the scan lines G1, G2 extending respectively therefrom, or the scan lines G1, G2 may extend from a single individual custom gate IC.

In addition, the configurations, operations and the like of the radiation imaging system 100, the radiation detector 10, the pixels 20 and the like that were described in the present exemplary embodiment are examples, and may, of course, be changed in accordance with the situation within a range that does not deviate from the gist of the present invention.

Further, in the present exemplary embodiment, the radiation of the present invention is not particularly limited, and X-rays, γ-rays or the like can be used.

What is claimed is:

1. A radiographic image detector comprising:
a sensor portion including a plurality of pixels, arrayed in a honeycomb pattern, that each generates charges according to irradiated radiation and has a hexagonal shaped pixel region;
a detection section, provided for each of the plurality of pixels, each including a pixel electrode that collects the charges, a storage capacitor that accumulates the charges collected by the pixel electrode, and a first switching element and a second switching element that read out the charges accumulated in the storage capacitor;
a plurality of first scan lines that are disposed one for each of a plurality of pixel rows and that are each connected to control terminals of the first switching elements in the corresponding pixel row;
a plurality of second scan lines that are disposed one for each of respective pairs of the plurality of pixel rows that are adjacent to each other in a column direction, and that are each connected to control terminals of the second switching elements in the corresponding column direction adjacent pair of pixel rows;

a plurality of data lines that are disposed so as to respectively intersect with the plurality of first scan lines and the plurality of second scan lines, the plurality of data lines including,
- a plurality of first data lines that transmit first charge signals corresponding to a combined charge amount of 3 pixels that are read out by the second switching elements of the 3 pixels mutually adjacent in the respective pairs of column direction mutually adjacent pixel rows, and
- a plurality of second data lines that transmit second charge signals corresponding to a combined charge amount of 2 pixels that are read out by the second switching element of the 2 specific pixels adjacent to the 3 pixels in the pixel row direction, and transmit third charge signals of 1 pixel that is read out by the first switching element of the 1 specific pixel adjacent to the 2 specific pixels in the pixel column direction; and a plurality of charge amplifiers that are each connected to one end of the plurality of respective data lines, the plurality of charge amplifiers including,
- a plurality of first charge amplifiers that convert the first charge signals into voltage signals during a first period and
- a plurality of second charge amplifiers that sum the second charge signals and the third charge signals together and convert the sum into voltage signals during a second period.

2. The radiographic image detector of claim 1 wherein:
the plurality of data lines also transmit fourth charge signals that correspond to the charges of each of the plurality of pixels read out by the first switching elements provided in each of the plurality of pixels; and
the plurality of charge amplifiers also convert the fourth charge signals into voltage signals.

3. The radiographic image detector of claim 2 wherein:
the first charge signals and the second charge signals are signals corresponding to the combined charge amount read out by the second switching elements according to signals output to the plurality of second scan lines;
the third charge signals are signals corresponding to the charges read out by the first switching elements according to signals output by the plurality of first scan lines that are output according to the signal output from the plurality of second scan lines; and
the fourth charge signals are signals corresponding to the charges read out by the first switching elements of the plurality of pixels according to signals output by the plurality of first scan lines.

4. The radiographic image detector of claim 1, wherein the 3 pixels and 3 pixels configured by the 2 specific pixels and the 1 specific pixel, configure pixel groups of repeating units of 3 successive pixels in the same pixel row direction, 2 successive pixels along a pixel row direction adjacent in the pixel column direction below the 3 successive pixels, and 1 pixel adjacent in the pixel column direction above the 3 successive pixels, and the pixels are disposed such that two adjoining sides of each of the respective 3 pixels are respectively adjacent to one side of each of the other 2 pixels from the respective 3 pixels.

5. The radiographic image detector of claim 4, wherein combinations of the pixels configuring respective pixel groups are determined such that, when a plurality of hexagonal shaped regions are formed adjacent to each other, the plurality of hexagonal shape regions results in a honeycomb pattern array, wherein each of the hexagonal shape regions are formed by including inside one center of gravity of a region surrounded by an outline of the plurality of pixel groups configured by the respective 3 pixels, and by connecting together 6 individual centers of gravity present at the periphery of the one center of gravity.

6. The radiographic image detector of claim 1, wherein the plurality of second charge amplifiers integrate the second charge signals during a period of the second period corresponding to the first period, and integrate the third charge signals during the second period after a period equivalent to the first period has elapsed.

7. The radiographic image detector of claim 1, wherein the hexagonal shaped pixel regions are each formed in a regular hexagonal shape.

8. The radiographic image detector of claim 1, wherein the hexagonal shaped pixel regions are each formed in a flattened hexagonal shape.

9. The radiographic image detector of claim 8, wherein the hexagonal shaped pixel regions are formed flattened such that one diagonal line out of 3 diagonal lines passing through the center of each of the pixel regions is shorter than the other two diagonal lines, and the other two diagonal lines are of equal length to each other.

10. The radiographic image detector of claim 1, wherein the plurality of data lines are disposed bent along one portion of the hexagonal shaped pixel region periphery.

11. The radiographic image detector of claim 1, wherein the sensor portion includes a semiconductor film that receives irradiation of radiation and generates charges,
wherein, the charges are accumulated in a storage capacitor provided in each of the plurality of pixels, and
wherein, the charges accumulated in the storage capacitor are read out by the first switching element and the second switching element.

12. The radiographic image detector of claim 11, further comprising: a plurality of common lines that connect together one electrode of each of the storage capacitors and that fixes the electrodes to a specific electrical potential.

13. The radiographic image detector of claim 12, wherein the plurality of common lines are connected to the plurality of data lines through the storage capacitors, the first switching elements, and the second switching elements.

14. The radiographic image detector of claim 12, wherein the plurality of first scan lines, the plurality of second scan lines, the plurality of data lines, the plurality of common lines, the first switching elements and the second switching elements are disposed at a lower layer side of the sensor portion.

15. The radiographic image detector of claim 1, wherein the sensor portion includes a scintillator that converts the radiation that has been irradiated into visible light, and
wherein, after the converted visible light has been converted into charges by a semiconductor layer, the charges are read by the first switching element and the second switching element.

16. A radiographic imaging apparatus comprising:
the radiographic image detector of claim 1, and that images a radiographic image with the radiographic image detector; and
a radiation source that irradiates radiation to the radiographic image detector.

17. A radiographic imaging system comprising:
the radiographic imaging apparatus of claim 16; and
a control section that instructs the radiographic imaging apparatus to perform imaging of a radiographic image and acquires a radiographic image from the radiographic imaging apparatus, wherein the control section comprises, a switching section that, based on an external instruction, switches between a first image acquisition method that acquires pixel data in single-pixel units of a radiographic image detection device, and a second image acquisition method that acquires image data in multi-pixel units of the radiographic image detection device.

* * * * *